United States Patent [19]

Kanda

[11] Patent Number: 5,206,847
[45] Date of Patent: Apr. 27, 1993

[54] INFORMATION RECORDING DISK, AND INFORMATION RECORDING/REPRODUCING METHOD AND APPARATUS UTILIZING THE SAME

[75] Inventor: Shigeto Kanda, Machida, Japan

[73] Assignee: Canon Kabushiki Kaisha, Tokyo, Japan

[21] Appl. No.: 501,737

[22] Filed: Mar. 30, 1990

[30] Foreign Application Priority Data

Mar. 31, 1989 [JP] Japan .................................. 1-83207

[51] Int. Cl.⁵ .............................................. G11B 7/00
[52] U.S. Cl. ............................ 369/44.130; 369/44.25; 369/44.26; 369/44.11
[58] Field of Search ................... 369/59, 275.1, 275.2, 369/275.3, 59, 275.4, 44.11, 44.13, 44.25, 44.26, 47, 48, 50, 58; 360/51

[56] References Cited

U.S. PATENT DOCUMENTS

| 4,495,474 | 1/1985 | Nishikawa et al. | 369/50 |
| 4,789,975 | 2/1988 | Taniyama | 369/50 |
| 4,791,622 | 12/1988 | Clay et al. | 364/54 |
| 4,799,112 | 1/1989 | Bremmer et al. | 360/51 |
| 4,803,677 | 2/1989 | Yamaguchi et al. | 364/275.3 |
| 4,819,218 | 4/1989 | Barnard | 369/59 |
| 4,860,271 | 8/1989 | Yokogawa et al. | 369/44.25 |
| 4,872,155 | 10/1989 | Yokogawa et al. | 369/59 |
| 4,873,679 | 10/1989 | Morai et al. | 360/51 |
| 4,907,215 | 3/1990 | Sako et al. | 369/59 |
| 4,918,677 | 4/1990 | Ashinuma et al. | 369/32 |

FOREIGN PATENT DOCUMENTS

| 0218214 | 4/1987 | European Pat. Off. |
| 0278006 | 8/1988 | European Pat. Off. |
| 59-3728 | 1/1984 | Japan . |
| WO8804824 | 6/1988 | PCT Int'l Appl. . |

*Primary Examiner*—Eugene R. LaRoche
*Assistant Examiner*—Tan Nguyen
*Attorney, Agent, or Firm*—Fitzpatrick, Cella, Harper & Scinto

[57] ABSTRACT

There is disclosed an information recording disk, and a method and apparatus for information recording and reproduction, enabling secure tracking and full utilization of the recording capacity. For this purpose, a spiral or concentric track divided into plural sectors is provided with servo signals for detecting tracking error, by an integral number per sector, and the number is made different between the tracks in the radially inner area of the disk and those in the outer area. The disk is rotated at a constant angular velocity, and the tracking error is detected by the servo signals with a first clock signal of a constant frequency, while the information recording and/or reproduction is conducted with a second clock signal having a frequency higher for the tracks in the outer area of the disk.

18 Claims, 7 Drawing Sheets

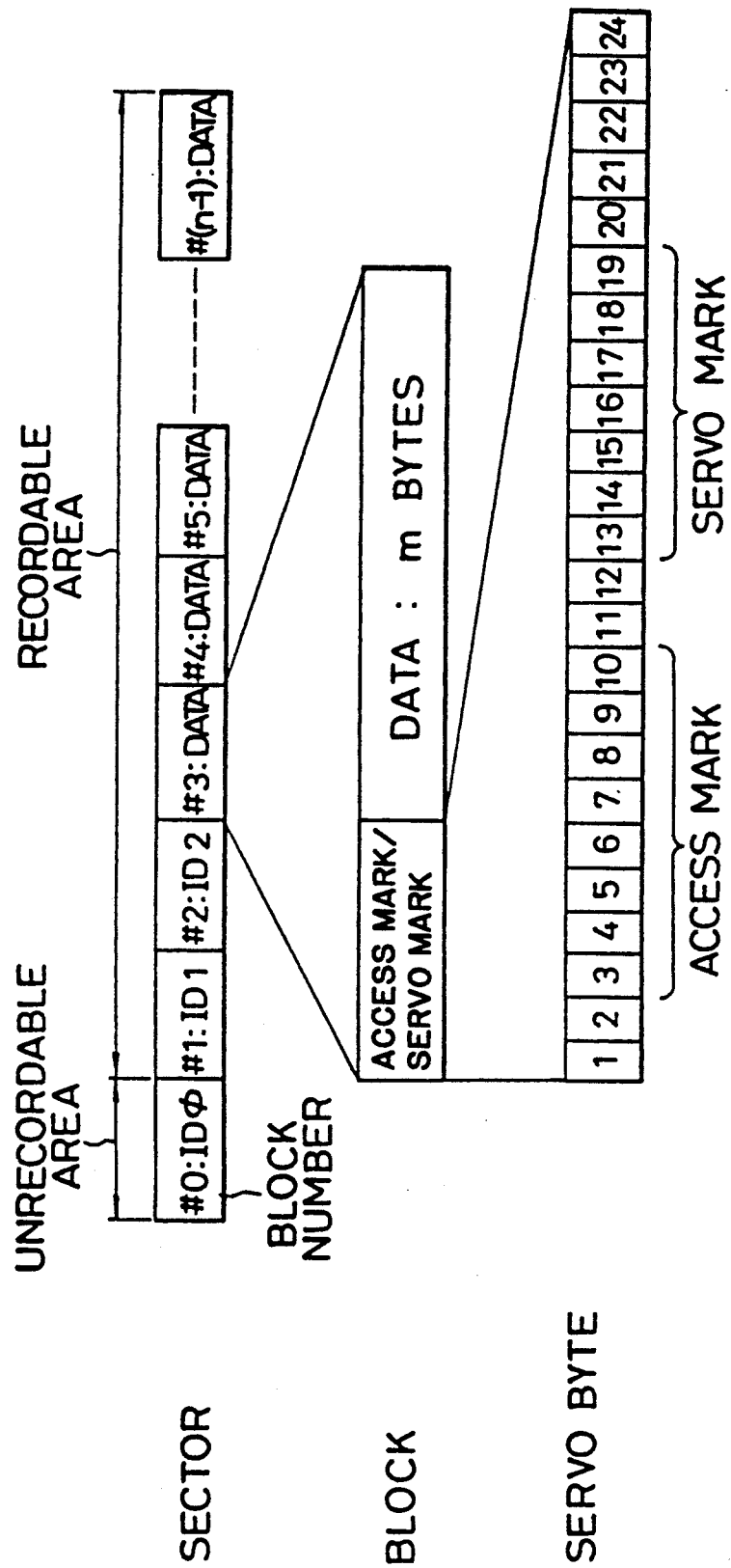

INFORMATION RECORDING DISK, AND INFORMATION RECORDING/REPRODUCING METHOD AND APPARATUS UTILIZING THE SAME

BACKGROUND OF THE INVENTION

1. Field of the Invention

The present invention relates to a disk-shaped information recording medium having concentric or spiral tracks on which servo signals for detecting tracking error are recorded in a discrete manner, and to a method and an apparatus for recording and/or reproducing information, utilizing such a recording medium.

2. Related Background Art

Optical disk apparatuses are commonly known as apparatus for recording and/or reproducing information on a disk-shaped information recording medium. In such apparatus, since the pitch of information tracks is as small as 1.5 to 1.6 μm, there is generally conducted a tracking servo for causing a light spot to track an information track, in which an objective lens working as light collecting means is moved by the deviation of the light spot from the information track, detected by optical means. Such a detection of the deviation is, for example, achieved by a discrete time method, usually called a sampling servo method. In such a method, as disclosed in the Japanese Patent Laid-open Application No. 59-3728, and as shown in FIG. 1, a front (or preceding) wobble pit 2 and a rear (or succeeding) wobble pit 4 are positioned with a deviation of about ¼ track pitch on both sides of an imaginary (or virtual) track 1, and the deviation from the imaginary track is detected on the basis of the optical modulation by such wobble pits. More specifically, the optical disk is rotated at a constant angular velocity, and, if the light spot passes over the pits on a trace line A deviated toward the periphery of the disk, on the imaginary track 1, and on a trace line B deviated toward the center of the disk as shown in FIG. 2, the light spot is modulated by the wobble pits as indicated by curves e, f and g in FIG. 2, respectively. Thus, when the light spot passes on the trace line A, it is closer to the front wobble pit 2 and farther from the rear wobble pit 4 so that an optical modulation by the front wobble pit 2 is larger and an optical modulation by the rear wobble pit 4 is smaller. The situation is reversed when the light spot passes on the trace line B. On the other hand, when the light spot passes on the imaginary track 1, optical modulations by the front and rear wobble pits 2, 4 are equal.

In this method, a clock pit 3 is used for generating a reference clock signal for extracting a tracking error signal. The wobble pit train consisting of the front wobble pit 2, clock pit 3 and rear wobble pit 4 is positioned at a constant angular interval in the circumferential direction of the optical disk. Accordingly, when the optical disk is rotated at a constant angular velocity, the light spot periodically passes the wobble pit train. A signal indicating the peak of modulation by the clock pit 3 is generated and a reference clock signal h shown in FIG. 2 is generated by a phase-locked loop (PLL) circuit. The front wobble pit 2 and the rear wobble pit 4 are so positioned that the modulation signals thereof are separated from the clock signal by a multiple of the period of the reference clock signal in the rotation of the optical disk with a constant angular velocity.

The tracking error signal is obtained by sample-holding the modulation signal based on the front wobble pit 2 at a time $t_1$ (at the setup of the reference clock signal), shown in FIG. 2, then sample-holding the modulation signal based on the rear wobble pit 4 at a time $t_2$, and subtracting the latter signal from the former signal. Thus, when the light spot passes on the imaginary track, the result of the subtraction is zero, because the modulation signals resulting from both wobble pits are mutually equal. When the light spot is on the trace line A, the subtraction provides a positive result as the modulation by the front wobble pit 2 is larger than that by the rear wobble pit 4, and when the light spot is on the trace line B, the subtraction provides a negative result as the modulation by the front wobble pit 2 is smaller than that by the rear wobble pit 4. The tracking error signal is detected from the wobble pit trains at a substantially constant interval, namely in a discrete time manner.

The modulation signal resulting from the wobble pit train is generally repeated at a constant interval over the entire surface of the optical disk. This is particularly effective in a seeking operation. In the case of radially moving the light spot and effecting the tracking servo operation on a desired track, if the modulation signals resulting from the wobble pit trains do not appear periodically before and after the movement, the locking function of the PLL circuit is again required so as to generate the reference clock signal for extracting the tracking error signal, so that a prompt capture operation of tracking servo is difficult.

In such an information record/reproducing apparatus employing the sampling servo method, it is conceivable to utilize the reference clock signal for extracting the tracking error signal, also as the reference clock signal for the digital information to be recorded between two wobble pit trains. Thus, the digital information is recorded by modulating the beam of a semiconductor laser in synchronization with the reference clock signal h shown in FIG. 2, thereby recording marks in the form of pits (in the case, of write once read many type), magnetic domains (in the case of photo-electro-magnetic type) or the like in the information recording film between two wobble pit trains. The reproduction of information can also be achieved by identifying the presence or absence of said marks, by inspecting the signal obtained by photoelectric conversion of the light reflected from the disk at timings synchronized with said reference clock signal h shown in FIG. 2.

However, such utilization of the same reference clock signal both for tracking error detection and for recording and/or reproduction results in a reduced efficiency of utilization of the surface area of the optical disk, when it is rotated at a constant angular velocity. An important limitation on recording or reproduction is posed by the size of the light spot. In an ordinary optical disk apparatus, the half-peak width of the light spot is about 1.5 μm, with a semiconductor laser having a wavelength of about 830 nm and an objective lens with a numerical aperture of 0.53. For securely achieving recording or reproduction with such a light spot, the minimum distance between the marks is about 1.5 μm. In an optical disk rotating at a constant angular velocity, the linear speed of a track is lowest at the innermost track and becomes larger as the position approaches the external periphery. Consequently, if the revolution of the optical disk and the reference clock signal are so determined as to obtain a minimum distance of 1.5 μm between the marks on the innermost track in the recording area, such a minimum distance on the outer tracks becomes larger than 1.5 μm, so that the surface area of the optical disk is wasted.

In order to improve the efficiency of utilization of the optical disk, there has been proposed a modified constant angular velocity (MCAV) method, in which the disk is radially divided into plural zones, and the frequency of the reference clock signal is selected higher in the outer zones.

However the MCAV method cannot be applied to the sampling servo method explained above, because, if the record/reproducing head makes an erroneous access to a wrong zone in the access to a desired track, the tracking cannot be locked owing to the difference in frequency of the reference clock signal, so that the operation thereafter is disabled.

SUMMARY OF THE INVENTION

In consideration of the foregoing, the object of the present invention is to provide an information recording disk enabling a secure tracking operation and still providing a large recording capacity, and a method and an apparatus for recording and/or reproduction utilizing such a disk.

The above-mentioned object can be attained, according to the present invention, by an information recording disk comprising:

concentric or spiral tracks of plural turns formed on said disk, wherein each track is divided into plural sectors; and servo signals for detecting a tracking error, recorded in a each sector in discrete manner, wherein said servo signals are recorded by an integral number in each sector, and the number of said servo signals per sector is different between a track in the inner part of the disk and a track in the outer part of the disk.

Also, the present invention provides a method of information recording and/or reproduction with the above-mentioned disk, the method comprising steps of:

rotating such a disk at a constant angular velocity;

detecting the tracking error on the basis of servo signals, utilizing a first reference clock signal of a constant frequency; and effecting information recording and/or reproduction on a desired track, utilizing a second reference clock signal having a frequency which is higher at a track positioned on an outer side of the disk.

Also, the present invention provides an apparatus for information recording and/or reproduction with such a disk, the apparatus comprising:

a motor for rotating the disk at a constant angular velocity;

a first clock generating circuit for generating a first reference clock signal of a constant frequency on the basis of the servo signals recorded on a desired track of the disk; and a second clock generating circuit for generating a second reference clock signal from said first reference clock signal, said circuit being adapted to change the frequency of said second reference clock signal to be higher when said desired track is positioned on an outer side of the disk;

an error detection circuit for detecting the tracking error on the basis of the servo signal recorded on said desired track, utilizing said first reference clock signal;

a head for information recording and/or reproduction on or from said desired track, based on said second reference clock signal; and a control circuit for effecting the tracking control of said head, utilizing the tracking error detected by said error detection circuit.

BRIEF DESCRIPTION OF THE DRAWINGS

FIG. 8 is a view of another embodiment of the disk formatting of the present invention.

DESCRIPTION OF THE PREFERRED EMBODIMENTS

Figure 1:
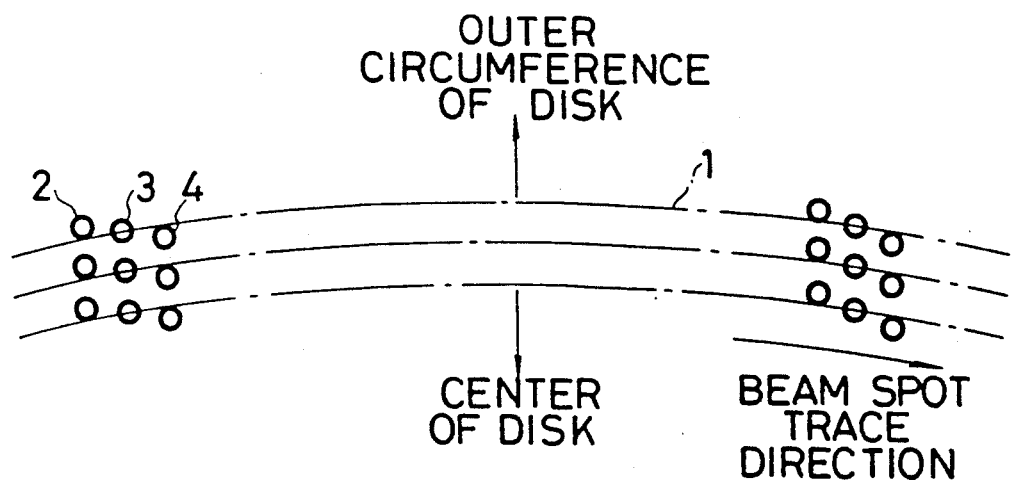
FIG. 1 is a view of servo signals recorded on a disk in a conventional sampling servo method.
Figure 2:
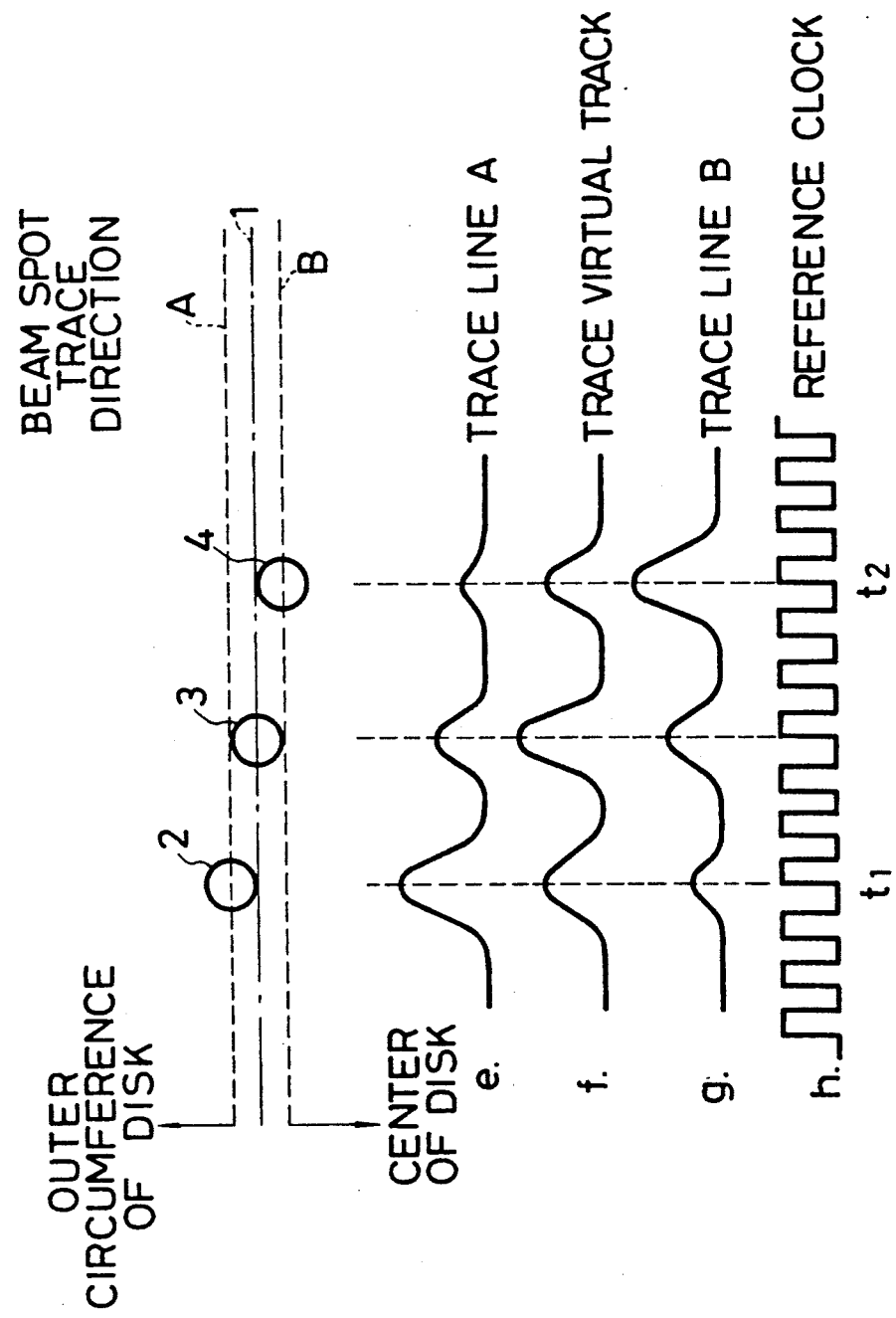
FIG. 2 is a view showing the method of detecting the tracking error on the basis of the servo signals shown in FIG. 1.
Figure 3:
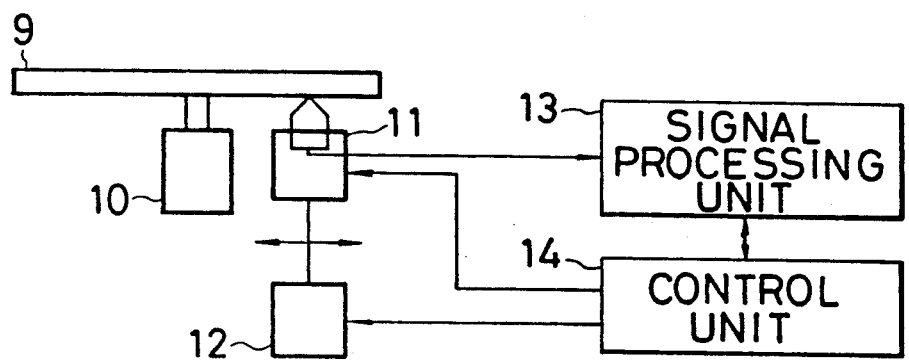
FIG. 3 is a schematic view of an information record-/reproducing apparatus of the present invention.

FIG. 3 is a schematic view showing an embodiment of the information record/reproducing apparatus of the present invention, wherein an information recording medium 9 comprises a magneto-optical (photo-electromagnetic) disk with a diameter of 86 mm. The signal recording and reproduction are conducted in an area, from 48 to 80 mm in diameter, of said disk. A motor 10 is provided for rotating said disk at 3600 rpm, and the revolution of said motor is controlled by a revolution controller (not shown). An optical head 11 incorporates therein a semiconductor laser of a wavelength 830 nm constituting a light source, a collimating lens, an objective lens, an actuator for moving said objective lens in the focusing direction and in the tracking direction, a polarizing beam splitter, and a PIN photodiode serving as a photoelectric converter, and focusing the beam emitted from the semiconductor laser onto the disk 9 by unrepresented means, maintaining the light spot in about 1.5 μm in the half-peak width. Also, the reflected light from the disk 9 enters the PIN photodiode, whereby the optical modulation by the pits embossed on the disk 9 and the modulation caused by the Kerr effect of the magnetic domain marks can both be photo-electrically converted by said PIN photodiode and supplied to a signal processing unit 13. There are also provided a linear motor 12 for moving the optical head 11 in the radial direction of the disk 9, and a control unit 14 for controlling the tracking actuator of the optical head 11 and the linear motor 12, based on the tracking error signal and the address information obtained from the signal processing unit 13.

Figure 4:
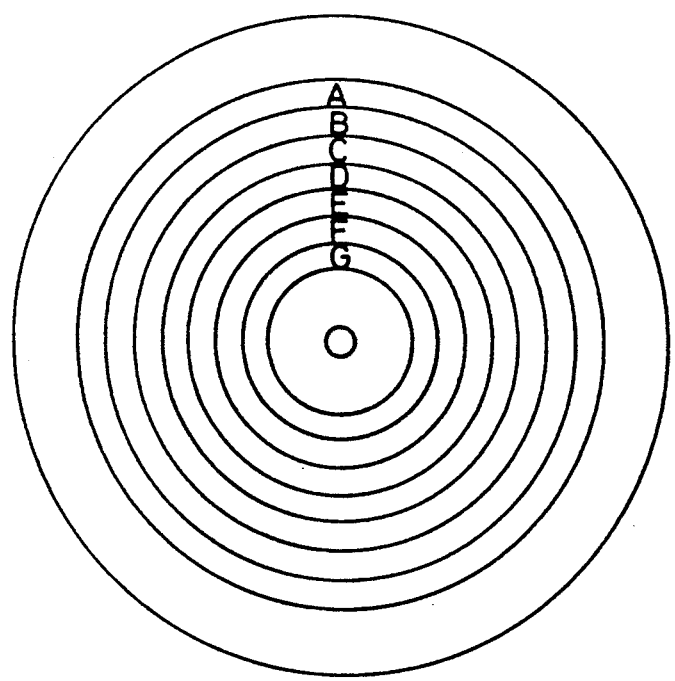
FIG. 4 is a view showing zone division in an information recording disk of the present invention.

In the following, there will be explained the format of the disk 9. A record/reproducing area is defined from 40 to 24 mm in radius, in which servo bytes, to be explained later, are provided in a number of 1672 per turn, in a spiral pattern with a radial pitch of 1.5 μm. Thus the record/reproducing area contains 10,666 imaginary tracks in a spiral pattern with a pitch of 1.5 μm. In addition, the record/reproducing area is divided, as shown in FIG. 4, in seven concentric zones A-G. The digital information is recorded or reproduced by a unit of 512 bytes, but the actual recording data consist of 584 bytes including the error correction code (ECC) and the control data. These recording data are encoded by 4/11 encoding and recorded by NRZ (non return to zero) modulation. Thus, after the encoding, a logic bit 1 or 0 respectively corresponds to the presence or absence of a mark. The 4/11 encoding is used for converting 8-bit data into an 11-bit code as already known, but will not be explained in detail as it is not directly related to the present invention.

The actual recording data of 584 bytes are recorded in or reproduced from each sector constituting a recording unit on the magneto-optical (photo-electromagnetic) disk. Each sector is defined by dividing a track of one turn into a plural number.

Figure 5:
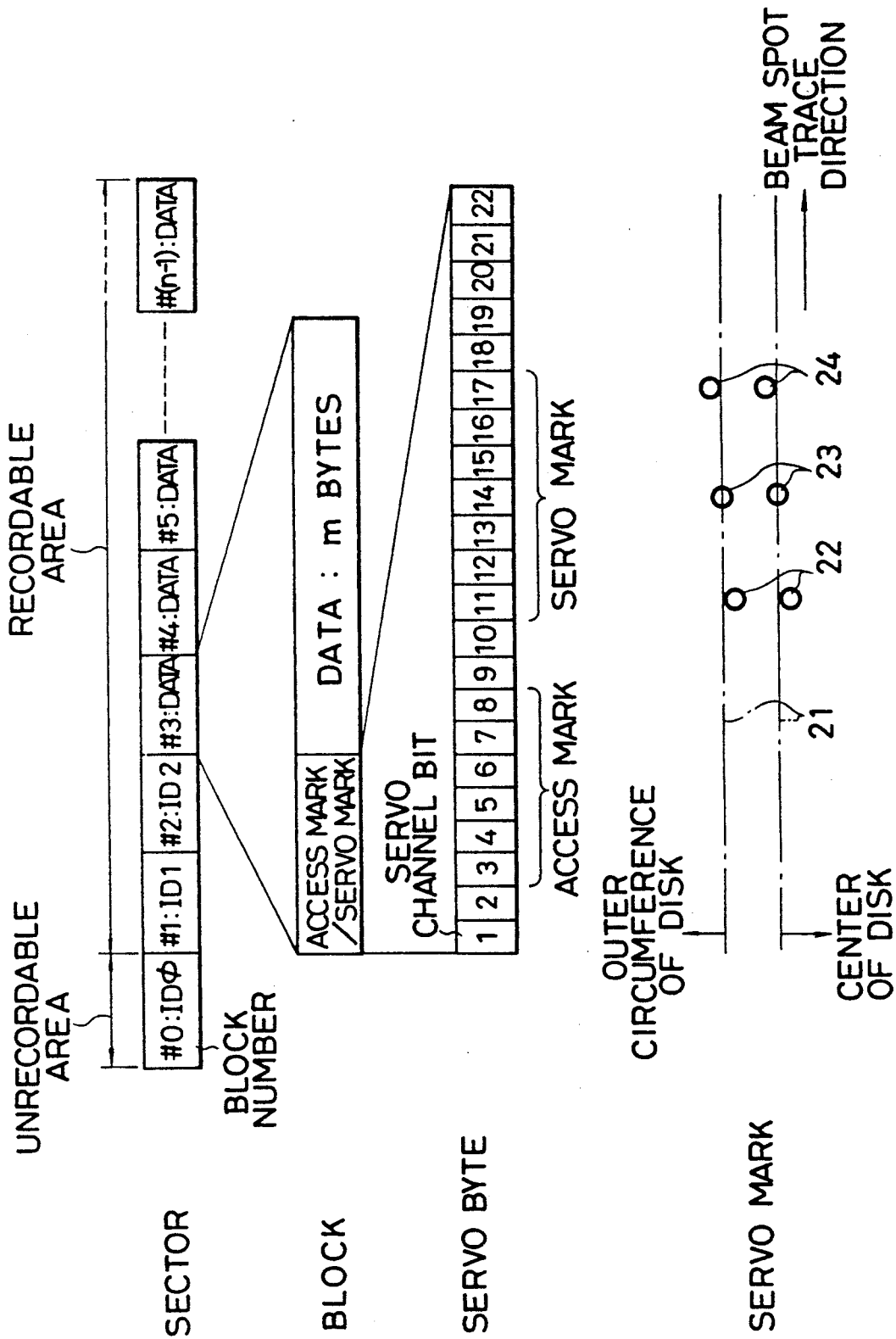
FIG. 5 is a view of the disk formatting in an embodiment of the present invention.

FIG. 5 shows the content of a sector, which is composed of n blocks, wherein the value of n varies according to the zone shown in FIG. 4. More specifically, n=45 in the outermost zone A; n=48 in zone B; n=52 in zone C; n=57 in zone D; n=62 in zone E, n=68 in zone F; and n=76 in the innermost zone G. In any sector in any zone, the first block #0 is not available for recording, and contains a sector mark for identifying the start of a sector, a track address and a sector address, all by embossed pits. Ensuing blocks #1, #2 are available for recording, and record a logic sector address, of which a record/reproducing bit rate is equal to the servo channel bit rate to be explained later. At the start of each of the blocks #0−#(n−1), there are provided servo bytes, which are divided into 22 servo channel bits. The rate of said servo channel bits is the same for each of the zones, and is 60 (Hz)×1672 (blocks/turn)×110 (servo channel bits/block)≈11.04 Mbps. In the blocks #3−#(n−1), the servo bytes are followed by the aforementioned actual recording data of 584 bytes, but the number m of bytes of actual recording data per block varies according to the zone. More specifically, m=14 in zone A; m=13 in zone B; m=12 in zone C; m=11 in zone D, m=10 in zone E, m=9 in zone F and m=8 in zone G. The data channel bit rate in the data area of the block varies depending on the zone, and the ratio of the rates is equal to the ratio of the number of bytes of actual recording data in the blocks. Thus, the rate is 11.04×14/8≈19.31 Mbps in zone A; 11.04×13/8≈17.93 Mbps in zone B; 11.04×12/8≈16.55 Mbps in zone C; 11.04×11/8≈15.17 Mbps in zone D; 11.04×10/8≈13.79 Mbps in zone E; 11.04×9/8≈12.41 Mbps in zone F; and 11.04×8/8=11.04 Mbps in zone G.

In the 3rd to 8th bits of the servo bytes, a relative track address is formed as an access mark, in the form of encoded embossed pits. This pattern is repeated in every 18 tracks, and is used for detecting the distance to the desired track in the course of movement of the optical head 11 by the linear motor 12 in a seeking operation, thereby increasing the speed of the seeking operation. In the 11th to 17th bits, there are formed, as shown in the lower part of FIG. 5, a front (or preceding) wobble pit 22 and a rear (or succeeding) wobble pit 24 deviated from the imaginary (or virtual) track 21 and serving to detect the tracking error signal, and a clock pit 23 positioned at the center of the track 21 for generating the servo reference clock signal, all in the form of embossed pits.

Figure 6:
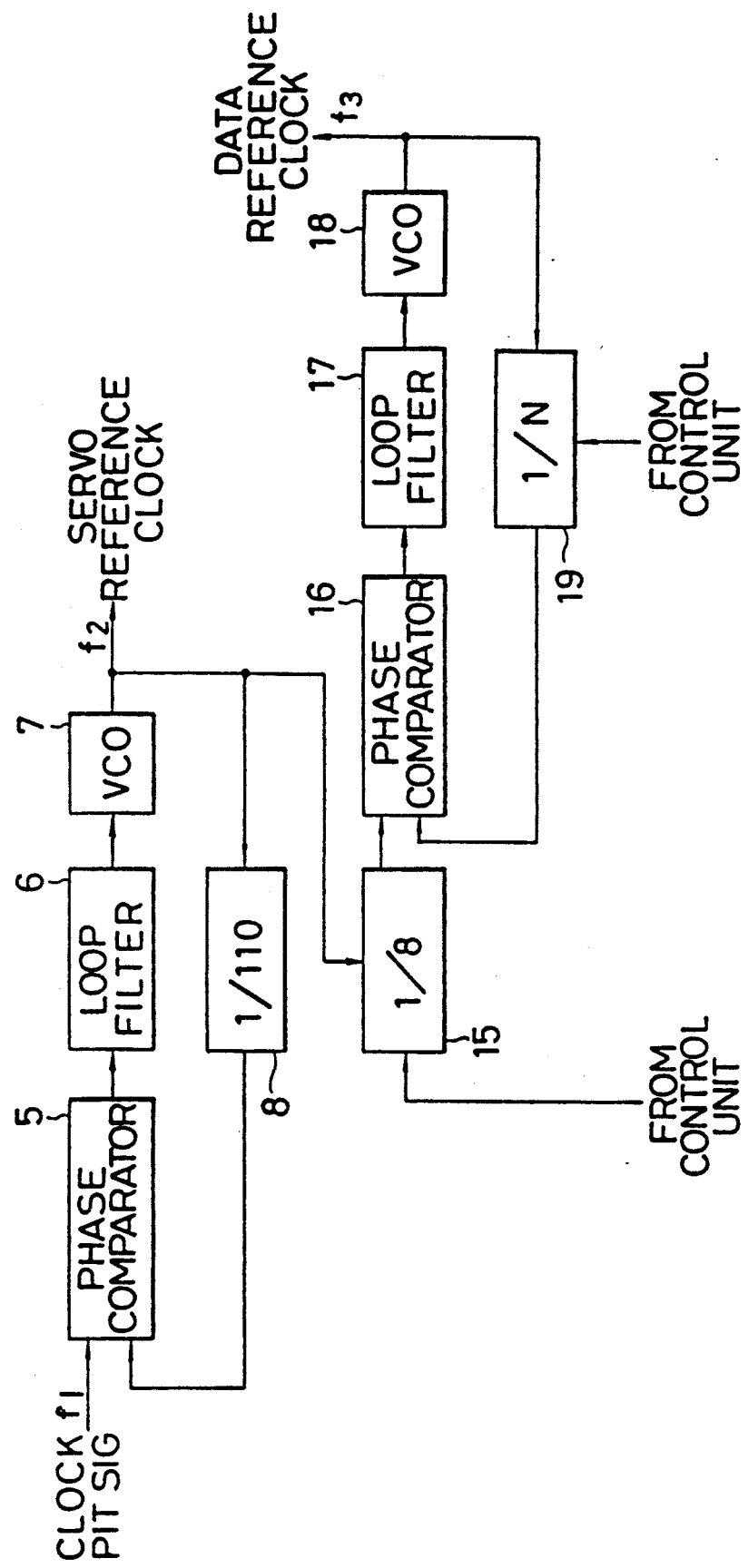
FIG. 6 is a block diagram of a an example of PLL circuit in the information record/reproducing apparatus of the present invention.

The signal processing unit 13 shown in FIG. 3 includes 2-stage PLL circuits as shown in FIG. 6, wherein the first PLL circuit, for generating the servo reference clock signal from a clock pit signal generated when the light spot passes through the clock pit, comprises a phase comparator 5, a loop filter 6, a voltage-controlled oscillator (VCO) 7, and a 1/110 frequency divider 8. The second PLL circuit, for generating a data reference clock signal by receiving a frequency-divided signal obtained by a ⅛ frequency divider 15 from the servo reference clock signal generated in the first PLL circuit, comprises a phase comparator 16, a loop filter 17, a VCO 18, and a frequency divider 19 with a variable frequency dividing ratio. The frequency dividing ratio N in the frequency divider 19 varies according to the zone of information recording and/or reproduction. Said ratio is N=14 in zone A, N=13 in zone B, N=12 in zone C, N=11 in zone D, N=10 in zone E, N=9 in zone F, and N=8 in zone G, as controlled by the control unit 14. As will be apparent from FIG. 6, the frequency $f_1$ of the clock pit signal and the frequency $f_2$ of the servo reference clock signal are correlated by:

$$f_2 = 110 \times f_1$$

so that the frequency $f_3$ of the data reference clock signal can be represented by:

$$f_3 = N/8 \cdot f_2 = N/8 \cdot 110 \cdot f_1$$

Since the revolution of the optical disk 9 is 60 Hz, and 1672 clock pits are formed per turn of the track, there are obtained $f_1 = 100.32$ KHz and $f_2 \approx 11.04$ MHz.

Figure 7:
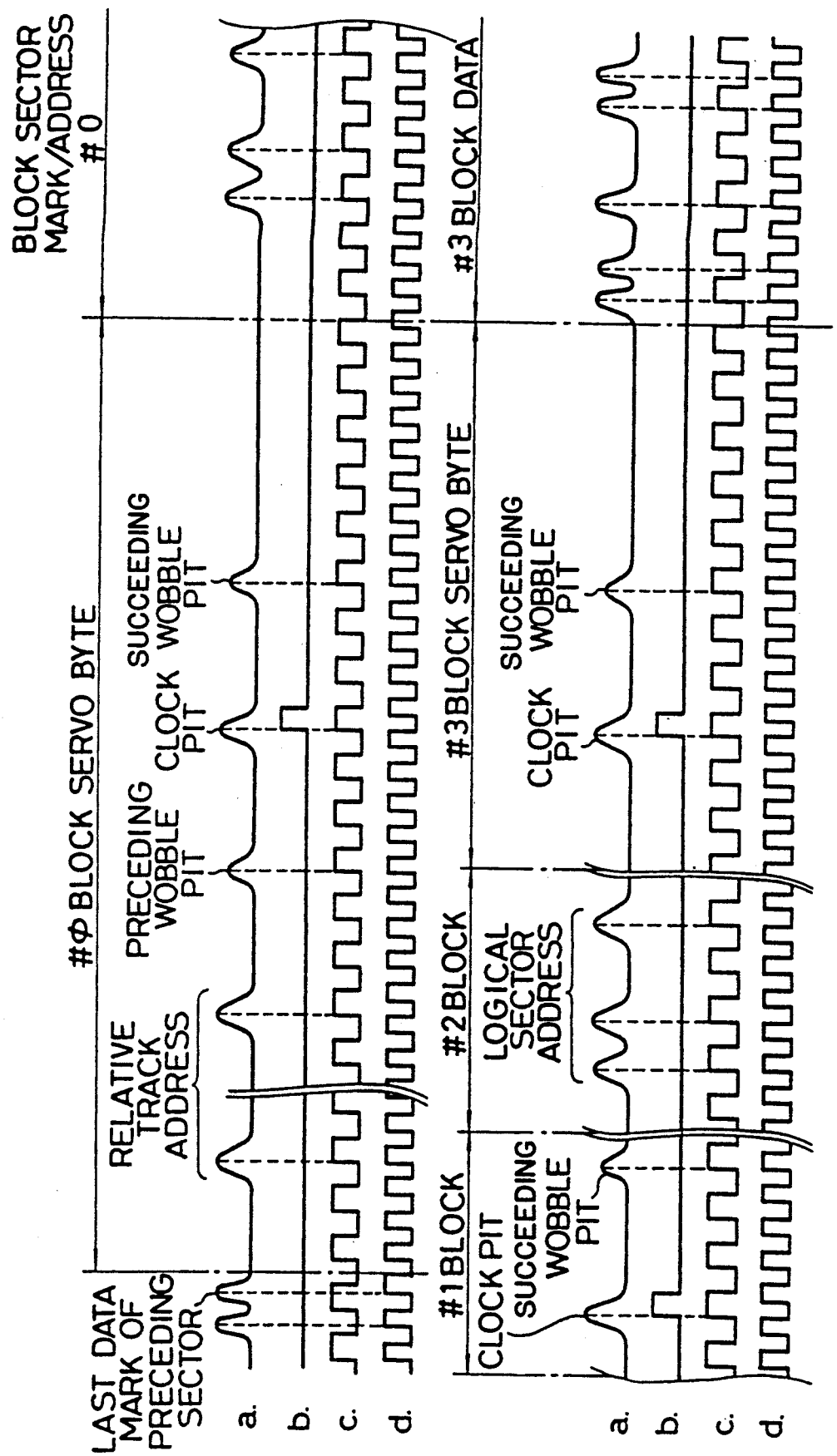
FIG. 7 is a wave form chart of signals in an embodiment of the present invention.

In the following, there will be explained the function of the present embodiment with reference to FIG. 7, showing the wave forms of various signals when the light spot passes through a sector in the zone C. A signal a obtained by photoelectric conversion in the photodetector and the optical head shows modulations by embossed marks and magneto-optical marks by approximately the same amplitudes. A clock pit signal b is a pulse signal generated at the peak of the clock pit at each of the servo bytes. The servo reference clock signal c is generated by entering the clock pit signal into the first PLL circuit shown in FIG. 6, and the data reference clock signal d is similarly generated by the second PLL circuit shown in FIG. 6. In generating the data reference clock signal, after the detection of the sector mark of the clock #0, the ⅛ frequency divider 15 of the second PLL circuit is reset by the clock pit signal of the block #1, in order to start the frequency division once in each sector and to match the phase of the data reference clock signal. In the blocks #0-#2, the identification of marks, including the servo bytes, is conducted by the servo reference clock signal. In the block #3 and thereafter, the mark identification is conducted with the servo reference clock signal for the servo bytes only, and with the data reference clock signal in the data area. In the wobble bits of all the servo bytes, the voltages are subjected to sample-holding approximately at the centers by the servo reference clock signal, and are then subjected to subtraction to generate the tracking error signal. Based on the tracking error signal, the control unit 14 drives the tracking actuator of the optical head 11, thereby achieving the tracking servo operation and causing the light spot to follow the imaginary track.

In the foregoing embodiment, the servo bytes consist of two bytes in the actual recording data, or 2×11=22 channel bits. Since the frequency of the data reference clock signal is n/8 times that of the servo reference clock signal, a correction is needed if the number of channel bits in the servo bytes is not a multiple of eight.

In the foregoing embodiment, since 22/8=2.75, the number of data reference clock pulses in the servo bytes is not an integer. For example, in the zone F, in which the frequency of the data reference clock signal is 9/8 times that of the servo reference clock signal, the number of data reference clock pulses in the servo bytes is 22×9/8=24.75. Consequently, if the data reference clock signal is used for defining the start point of the data area, there are obtained 24 or 25 counts, depending on the block. As the count in the data area is constantly 99 in a block of the zone F, it becomes necessary to vary the count for detecting the length of the block either as 24+99=123 or 25+99=124.

In the following, there will be explained a preferred embodiment not requiring such correction. From the foregoing explanation it will be understood that such correction is required because the number of channel bits of the servo bytes is not a multiple of the number of data bytes actually recorded by the servo reference clock signal in the data area, namely not a multiple of 8. In the present embodiment, therefore, the number of channel bits of the servo bytes is selected as 24 bits as shown in FIG. 8. Also, in the circuit structure, the 1/110 frequency divider 8 in FIG. 6 is replaced by a 1/112 frequency divider. Consequently the count of the data reference clock signal in the servo bytes becomes an integer, so that the number of the data reference clock pulses in each block also becomes an integer. For example, in the zone F, the servo bytes contain 27 data reference clock pulses, while the data area contains 99 data reference clock pulses, so that the entire block contains 27+99=126 pulses. Consequently, in the present embodiment, by initializing the ⅛ frequency divider of the PLL circuit at the start of a sector and confirming the start point of the data area of the block #3, the start point of the next data area is exactly repeated at every 126 counts of the data reference clock pulses.

The present invention is not limited to the foregoing embodiments, but is subject to various applications. For example, the tracks may be formed concentrically instead of spirally. Also, the present invention is applicable to a magnetic disk and a magnetic disk apparatus in which information recording and reproduction are conducted with a magnetic head. The present invention includes all such applications within the scope and spirit of the appended claims.

What is claimed:

1. An information recording disk comprising:
   a plurality of tracks arranged in a plurality of turns in one of a concentric and a spiral manner on said disk, wherein each of said tracks is divided into a plurality of sectors each recording therein information of a predetermined number of bytes; and
   a plurality of servo signals for detecting tracking error, said servo signals being discretely recorded in each of said sectors at predetermined angular intervals and comprising first and second wobble pits formed in positions which mutually deviate from the center of a respective track in opposite directions, wherein the number of said servo signals recorded in each sector is an integer and the integral number in an inner track being greater than that in an outer track.

2. An information recording disk according to claim 1, said disk being radially divided into a plurality of zones each containing a plurality of tracks, wherein the number of servo signals per sector is constant within a respective zone and variable for different zones.

3. An information recording disk according to claim 1, wherein each of said sectors is divided into a plurality of blocks of a number the same as that of the servo signals recorded in a respective sector, and a servo signal is recorded in each of said blocks.

4. An information recording disk according to claim 3, further comprising an address signal recorded in the first block in each of said sectors having a recording and/or reproducing bit rate equal to a bit rate of a respective servo signal.

5. An information recording disk according to claim 1, wherein said servo signals further comprise clock pits formed in the center of a track.

6. An information recording disk according to claim 1, wherein said disk comprises an optical disk capable of recording and/or reproducing information by irradiation with a light beam.

7. An information recording disk according to claim 6, wherein said disk comprises a photo-electro-magnetic disk.

8. A method of recording information on and/or reproducing information from a disk having thereon a plurality of tracks arranged in a plurality of turns in one of a concentric and a spiral manner, each of said tracks being divided into a plurality of sectors each recording therein information of a predetermined number of bytes, and a plurality of servo signals for detecting tracking error, said servo signals being discretely recorded therein in each of said sectors at predetermined angular intervals and including first and second wobble pits formed in positions which mutually deviate from the center of a respective track in opposite directions, the number of said servo signals recorded in each sector being an integer and the integral number in an inner track being greater than that in an outer track, said method comprising steps of:
   rotating the disk at a constant angular velocity;
   detecting the tracking error on the basis of the servo signals, by utilizing a first reference clock signal having a constant frequency; and
   effecting recording of information on and/or reproducing of information from a desired track, by utilizing a second reference clock signal, and by controlling frequency of the second reference clock signal so as to be higher when the desired track is positioned on an outer side of the disk.

9. A method according to claim 8, further comprising radially dividing the disk into a plurality of zones each containing a plurality of tracks, and controlling the frequency of the second reference clock signal so as to be constant within a respective zone and variable for different zones.

10. A method according to claim 9, further comprising circumferentially dividing each of the tracks into a plurality of blocks on the basis of the servo signals, and wherein the number of bytes of the data actually recorded in each block is an integral number which varies depending on the zone of the block.

11. A method according to claim 10, wherein the ratio of the respective frequencies of the second reference clock signal in different zones is equal to the ratio of the number of bytes of data actually recorded per block in the respective zones.

12. A method according to claim 10, wherein the number of channel bits of each of the servo signals is an integral multiple of the ratio of the number of bytes of data actually recorded per block and the first reference clock signal.

13. An apparatus for recording information on and-/or reproducing information from a disk having thereon a plurality of tracks arranged in a plurality of turns in one of a concentric and a spiral manner, each of said tracks being divided into a plurality of sectors each recording therein information of a predetermined number of bytes, and a plurality of servo signals for detecting tracking error, said servo signals being discretely recorded therein in each of said sectors at predetermined angular intervals and including first and second wobble pits formed in positions which mutually deviate from the center of a respective track in opposite directions, the number of said servo signals recorded in each sector being an integer and the integral number in an inner track being greater than that in an outer track, said apparatus comprising:

a motor for rotating the disk at a constant angular velocity;

a first clock generating circuit for generating a first reference clock signal having a constant frequency on the basis of the servo signals recorded on a desired track of the disk;

a second clock generating circuit for generating a second reference clock signal from the first reference clock signal, said second clock generating circuit comprising means for controlling the frequency of the second reference clock signal so as to be higher when the desired track is located on an outer side of the disk;

an error detection circuit for detecting tracking error on the basis of the servo signals recorded on the desired track by utilizing the first reference clock signal;

a head for effecting recording of information on and-/or reproducing of information from the desired track, based on the second reference clock signal; and a control circuit for effecting the tracking control of said head, by utilizing the tracking error detected by said error detection circuit.

14. An apparatus according to claim 13, wherein said first clock generating circuit comprises a phase-locked loop circuit including a voltage-controlled oscillator for generating a first reference clock signal, a frequency divider for dividing the frequency of the output of said oscillator, and a phase comparator for comparing the phase of an output of said frequency divider with that of the servo signal read by said head to thereby control said oscillator.

15. An apparatus according to claim 13, wherein said second clock generating circuit comprises a phase-locked loop circuit including a voltage-controlled oscillator for generating a second reference clock signal, a first frequency divider having a variable frequency dividing rate, for dividing the frequency of the output of said oscillator, a second frequency divider for dividing the frequency of said first reference clock signal, and a phase comparator for comparing the phase of an output of said first frequency divider with that of an output of said second frequency divider to thereby control said oscillator.

16. An apparatus according to claim 13, wherein each of the tracks of the disk is circumferentially divided into a plurality of sectors, and further comprising means for resetting said second clock generating circuit whenever said head passes each sector.

17. An apparatus according to claim 13, wherein the disk is radially divided into a plurality of zones each containing a plurality of tracks, and said second clock generating circuit comprises means for controlling the frequency of the second reference clock signal so as to be constant within a respective zone and variable for different zones.

18. An apparatus according to claim 13, wherein said head comprises an optical head for effecting information recording the reproduction by irradiation of a light beam onto the disk.

* * * * *

UNITED STATES PATENT AND TRADEMARK OFFICE
CERTIFICATE OF CORRECTION

PATENT NO. : 5,206,847
DATED : April 27, 1993
INVENTOR(S) : Shigeto Kanda

It is certified that error appears in the above-indentified patent and that said Letters Patent is hereby corrected as shown below:

COLUMN 2

Line 38, "case," should read --case--.

COLUMN 3

Line 31, "a" should be deleted, and "in" (second occurrence) should read --in a--; and
Line 55, "and" should be deleted.

COLUMN 4

Line 16, "invention;," should read --invention;--;
Line 17, "a" (second occurrence) should be deleted, and "PLL" should read --a PLL--; and
Line 62, "Thus" should read --Thus,--.

UNITED STATES PATENT AND TRADEMARK OFFICE
CERTIFICATE OF CORRECTION

PATENT NO. : 5,206,847

DATED : April 27, 1993

INVENTOR(S) : Shigeto Kanda

It is certified that error appears in the above-indentified patent and that said Letters Patent is hereby corrected as shown below:

COLUMN 10

Line 39, "the" should read --and--.

Signed and Sealed this

Fifth Day of April, 1994

Attest:

BRUCE LEHMAN

*Attesting Officer*       *Commissioner of Patents and Trademarks*